United States Patent [19]

Akesaka

[11] Patent Number: 4,915,543
[45] Date of Patent: Apr. 10, 1990

[54] EXISTING PIPELINE RENEWING METHOD AND APPARATUS THEREFOR

[75] Inventor: Toshio Akesaka, Yokohama, Japan

[73] Assignee: Kabushiki Kaisha Iseki Kaihatsu Koki, Tokyo, Japan

[21] Appl. No.: 307,282

[22] Filed: Feb. 6, 1989

Related U.S. Application Data

[62] Division of Ser. No. 193,110, May 11, 1988.

[51] Int. Cl.⁴ .............................................. E03F 3/06
[52] U.S. Cl. ..................................... 405/156; 405/154; 405/184; 299/58
[58] Field of Search ................ 405/141, 144, 154, 184, 405/156; 299/31

[56] References Cited

U.S. PATENT DOCUMENTS

| | | | |
|---|---|---|---|
| 4,176,985 | 12/1979 | Cherrington | 405/154 |
| 4,311,344 | 1/1982 | Akesaka | 405/144 X |
| 4,406,498 | 9/1983 | Akesaka | 405/144 X |
| 4,534,676 | 8/1985 | Saito | 405/141 X |
| 4,553,877 | 11/1985 | Edvardsen | 405/154 |
| 4,692,062 | 9/1987 | Akesaka | 405/141 |

FOREIGN PATENT DOCUMENTS 61-102999 5/1986 Japan.

Primary Examiner—Dennis L. Taylor
Assistant Examiner—Arlen L. Olsen
Attorney, Agent, or Firm—Mattern, Ware, Stoltz & Fressola

[57] ABSTRACT

A method for renewing an existing pipeline comprises the steps of advancing a shield tunnelling machine from one end of an existing pipe defining the existing pipeline to the other end thereof, excavating at least the existing pipe by the machine and disposing a new pipe in an excavated spot while the machine is advanced, whereby the existing pipeline is renewed by breaking the existing pipe embedded in the ground while laying the new pipe therein. An existing pipeline renewing apparatus embodying the method described above comprises a shield tunnelling machine for excavating an existing pipe embedded in the ground so as to define an existing pipeline and a means for disposing a new pipe in a spot excavated by the machine. Accordingly, since the new pipe is disposed while excavating the existing pipe by the shield tunnelling machine, it is not necessary to excavate the spot, in which the existing pipe to be renewed is laid, by an open cut method.

20 Claims, 8 Drawing Sheets

EXISTING PIPELINE RENEWING METHOD AND APPARATUS THEREFOR

This is a divisional of co-pending application Ser. No. 193,110, filed on May 11, 1988.

BACKGROUND OF THE INVENTION

1. Field of the Invention:

This invention relates to a method and apparatus for renewing an existing pipeline such as sewer pipeline and water supply pipeline without using any open cut method and, more particularly, to an existing pipeline renewing method and an apparatus therefor, which renews an existing pipeline by breaking an existing pipe embedded in the ground so as to define the existing pipeline and by laying a new pipe therein.

2. Description of the Prior Art:

Generally, deteriorated pipes embedded in the ground are renewed by a method which comprises the steps of excavating a ditch in a spot, under which the deteriorated pipe is embedded, by an open cut method or driving method to expose the existing pipe, removing the existing pipe, laying a new pipe therein, and subsequently refilling the excavated ditch.

This method, however, has to excavate the ditch. Therefore, when the spot to be excavated is on a road, the passage on the road has to be temporarily restricted.

Also, according to the prior method, since the use of the pipeline has to be stopped in the renewal, it is necessary to lay a bypass in place of the existing pipeline to be renewed.

SUMMARY OF THE INVENTION

An object of the present invention is to provide a method and an apparatus which can renew existing pipelines without using any open cut method.

Another object of the present invention is to provide an existing pipeline renewing method and an apparatus therefor, which can correctly lay new pipes without using any open cut method, even if the existing pipelines are curved.

Still another object of the present invention is to provide an existing pipeline renewing method and an apparatus therefor, which can discharge broken pieces of the existing pipes without using the existing pipe to be renewed.

A further object of the present invention is to provide a method and an apparatus, which can renew the existing pipeline without laying any bypass used for liquid flowing through the existing pipeline.

A still further object of the present invention is to provide a shield tunnelling machine, which can excavate existing pipes with small force without breaking the existing pipe at one time throughout a large extent of length.

The method for renewing existing pipeline according to the present invention comprises the steps of advancing a shield tunnelling machine from one end of an existing pipe defining the existing pipeline to the other end thereof, excavating at least the existing pipe by the shield tunnelling machine and disposing the new pipe in the excavated spot while the shield tunnelling machine is advanced.

The apparatus for renewing existing pipelines according to the present invention comprises a shield tunnelling machine for excavating an existing pipe embedded in the ground so as to define the existing pipeline and a means for disposing a new pipe in the excavated spot.

According to the present invention, since the new pipes are disposed while excavating the existing pipe by the shield tunnelling machine, it is not necessary to excavate the spot, in which the existing pipe is laid, by the open cut method.

In a preferred embodiment of the present invention, the shield tunnelling machine has a size larger than the diameter of the existing pipe. Therefore, this machine excavates not only the existing pipe but also earth and sand around the existing pipe. Thus, the machine will excavate an extent wider than the cross section of the existing pipe. Accordingly, the new pipe can be correctly laid by correctly advancing the machine even if the existing pipeline is curved.

In the preferred embodiment, the new pipe is forced into a vacant spot excavated by the machine with a thrust device provided with a plurality of jacks. Therefore, the new pipe is disposed in the excavated vacant spot and the machine is advanced by the thrust applied through the new pipe.

In the preferred embodiment of the present invention, the existing pipe is sealed by a seal device which is advanced along the existing pipe together with the machine. Further, the substance excavated by the machine is discharged from the machine by a discharging device. Thus, the excavated substance is prevented from flowing into unbroken existing pipes by the seal device, while the existing pipe and earth and sand therearound can be excavated. Therefore, the excavated substance does not enter the unbroken existing pipe. Accordingly, it is not necessary to install any apparatus for receiving the excavated substance in a shaft reached by the machine and then discharging the received substance from the shaft, thereby resulting in cost reduction. Further, the seal device can be connected to the machine by a connector.

In the preferred embodiment of the present invention, the broken pieces of the existing pipe due to the excavation are further broken into smaller pieces by a crusher disposed in a front region of the machine. The smaller pieces thus broken are discharged to the rear of the machine together with drain liquid supplied from the rear of the machine to the front region thereof. Accordingly, the discharging device is prevented from being clogged with the broken pieces of the existing pipe.

In the preferred embodiment of the present invention, while the machine is advanced, sewage flowing through the existing pipe is adapted to flow through the seal device and the machine by a temporary watercourse device. Thereby, since it is not necessary to stop the use of the pipeline to be renewed, the pipeline can be renewed without providing any bypass used for sewage.

The seal device and machine can be interconnected with each other by a connector having a watercourse used for sewage. In this case, the sewage is adapted to flow from the seal device to the machine through the watercourse of the connector.

The seal device is preferably provided with a main body extending axially of the existing pipe, a plurality of guides disposed at angular intervals around the main body and extending axially of the existing pipe and a sealing member disposed around the main body such that the sealing member is brought into contact with the inner surface of the existing pipe. Thus, even if the inner surface of the existing pipe is irregular, the movement of the seal device is not hindered by the irregularity.

Also, the seal device is further preferably provided with a tubular case disposed so as to extend axially of the existing pipe, a shaft rotatably inserted into the case, a mechanism for rotating the shaft, a plurality of guides disposed at angular intervals around the case and extending axially of the existing pipe and a sealing member disposed around the case such that the sealing member is brought into contact with the inner surface of the existing pipe.

The shield tunnelling machine in the preferred embodiment according to the present invention comprises a shield body, a partition wall for dividing the interior of the shield body into a front region and a rear region, a crankshaft rotatably journalled by the partition wall and having an eccentric portion disposed in the front region, a drive means for rotating the crankshaft, a cutter assembly having a plurality of cutter bits and disposed in the front region of the shield body, the cutter assembly being revolved or turned around the rotary axis of the crankshaft along with the rotation of the crankshaft while being rotated around the axis of the eccentric portion to excavate at least the existing pipe with the cutter and a means for discharging the substance excavated by the cutter assembly from the front region to the outside.

Each cutter bit is disposed so as to excavate the existing pipe when the cutter bit moves toward the rotary axis of the cutter assembly along with the turning and rotation of the cutter assembly. For example, each cutter bit may be disposed such that the cutting edge thereof is on the rotary center side of the cutter assembly.

According to the shield tunnelling machine comprising the cutter bits as noted above, since the existing pipe is subjected to breaking force when the cutter bits are moved to the rotary center of the cutter assembly, any crack extending longitudinally of the existing pipe is not liable to generate in the existing pipe, so that the existing pipe is not broken throughout a large extent of length. Also, since the existing pipe is subjected to force directing toward the center thereof, the existing pipe can be broken with relatively small force compared with the shield tunnelling machine for exerting force directing outward on the existing pipe.

In the preferred embodiment, the shield tunnelling machine further comprises a rotor rotatably journalled by the eccentric portion of the crankshaft and disposed in the front region of the shield body and a gear mechanism provided with an internal gear fixed to one of the shield body or partition wall and the rotor and an external gear fixed to the other. Further, the cutter assembly is mounted on the tip portion of the rotor. Thereby, the cutter assembly turns around the rotary axis of the crankshaft and rotates around the eccentric portion along with the rotation of the crankshaft.

BRIEF DESCRIPTION OF THE DRAWINGS

The foregoing and other objects and features of the invention will become apparent from the following description of a preferred embodiment of the invention with reference to the accompanying drawings, in which.

DETAILED DESCRIPTION OF THE PREFERRED EMBODIMENT

Figure 1:
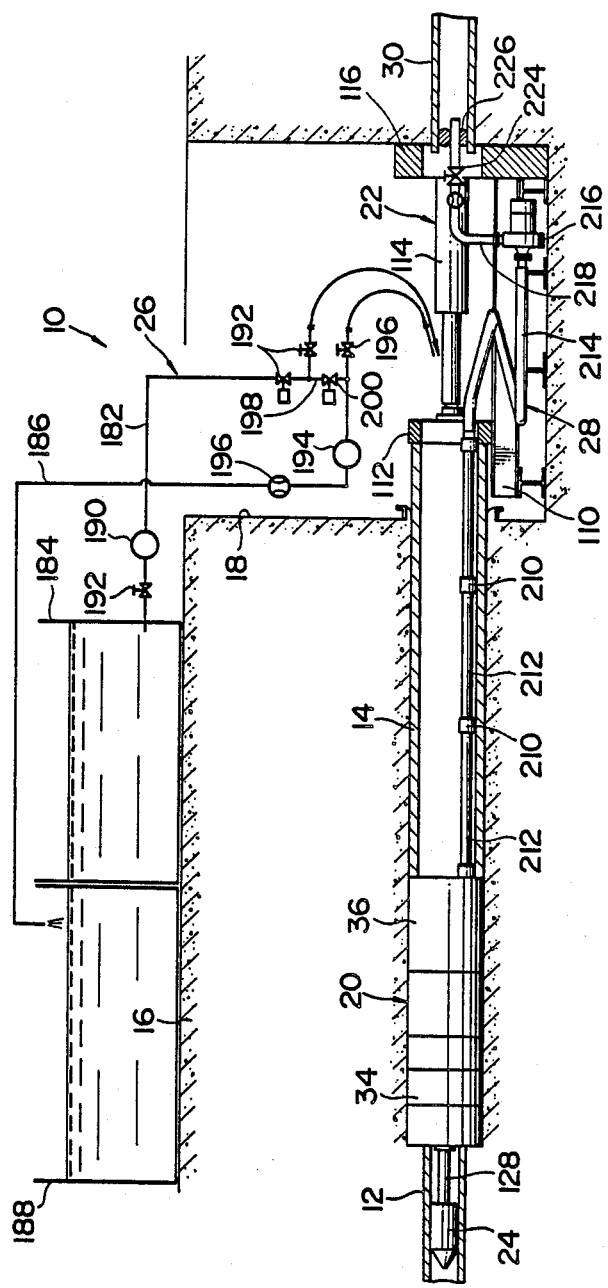
FIG. 1 is a front view showing an embodiment of an existing pipeline renewing apparatus according to the present invention.

An existing pipeline renewing apparatus 10 shown in FIG. 1 is used for work in which an existing concrete pipe 12 used for sewage embedded in the ground so as to define an existing pipeline is broken from its downstream side and a new concrete pipe 14 having a diameter larger than that of the existing pipe is laid.

The renewing apparatus 10 comprises a shield tunnelling machine 20 advanced from a starting shaft 18 constructed in a foundation 16 toward an arrival shaft (not shown) constructed on the upstream side thereof, a thrust device 22 for forcing the new pipe 14 into a vacant spot excavated by the machine 20 and advancing the machine 20, a seal device 24 movably disposed in the existing pipe 12 so as to prevent broken pieces of the existing pipe 12 and substance such as earth and sand excavated by the machine 20 from reaching the arrival shaft through the existing pipe 12, a discharging device 26 for discharging the excavated substance onto the ground and a temporary watercourse device 28 for permitting sewage in the existing pipe 12 to flow through the seal device 24 and machine 20 to a pipeline 30 on the downstream side.

The shield tunnelling machine 20 shown in FIGS. 2 to 6 comprises a tubular shield body 32 provided with first and second main bodies 34, 36 which are butted against each other.

Figure 2:
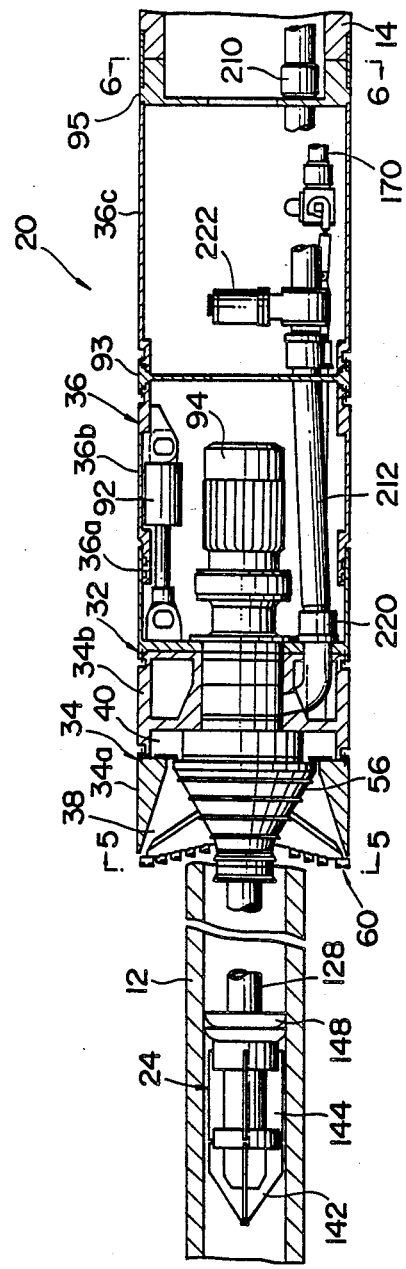
FIG. 2 is a sectional view of a shield body of a shield tunnelling machine for explaining the machine and a seal device.
Figure 3:
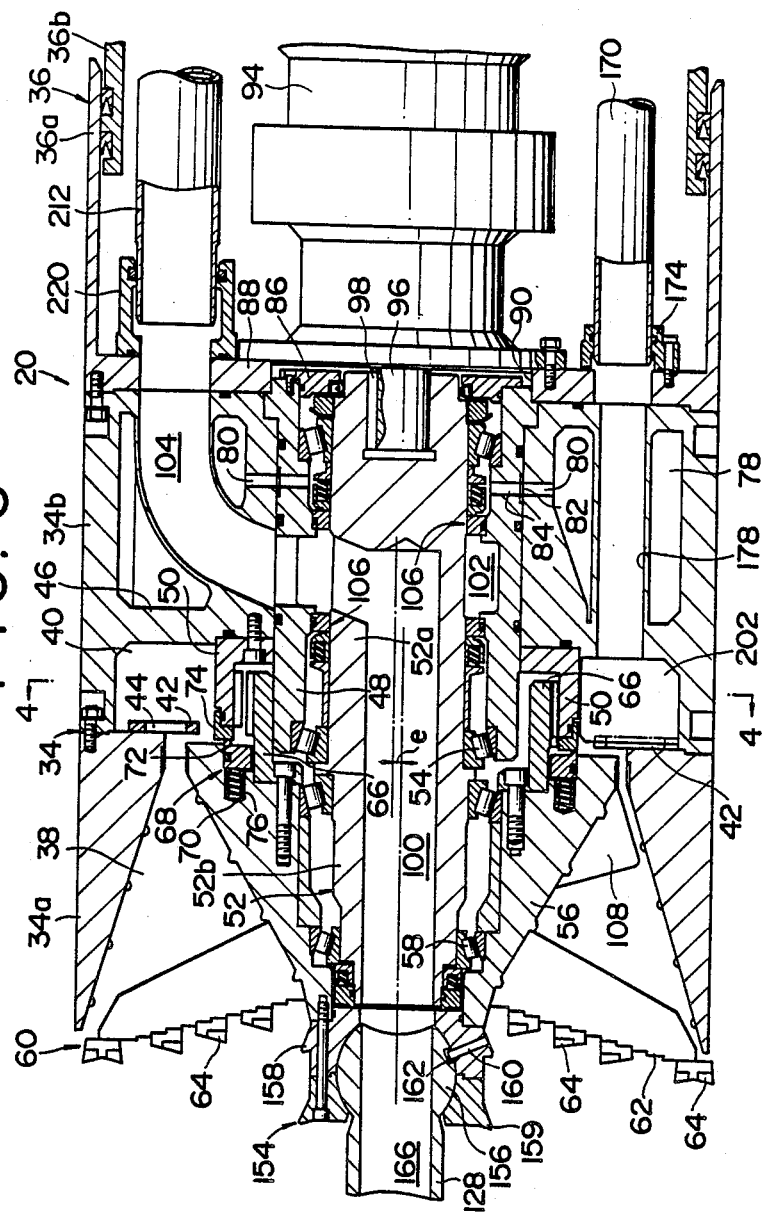
FIG. 3 is an enlarged-scale sectional view showing an embodiment of the machine.

As shown in FIGS. 2 and 3, the first main body 34 is provided with a first tubular portion 34a defining a conical breaking chamber or a first space 38 having the bore gradually converging toward the rear, and a second tubular portion 34b defining a muddy water chamber or a second space 40 following the rear end of the first space 38 and having a cross-section larger than the rear end of the first space. The first and second tubular portions 34a, 34b are mutually butted and removably coupled with each other at the rear end of the first tubular portion 34a and the front end of the second tubular portion 34b by means of a plurality of bolts. The first space 38 may have generally the same inner diameter as that of the second space 40.

As shown in FIG. 3, a second tubular portion 34b is formed on the outer peripheries of front and rear ends respectively with grooves extending circumferentially. On a flange formed at the outer periphery of the front end of the second tubular portion 34b by the groove formed on the front end of the second tubular portion 34b, there are disposed a plurality of bolts for removably interconnecting the first and second tubular portions 34a, 34b. On the other hand, at a flange formed on the outer periphery of the rear end of the second tubular portion 34b by the groove at the rear end of the second tubular portion, there 34b are disposed a plurality of bolts for interconnecting removably the first and second main bodies 34, 36.

Figure 4:
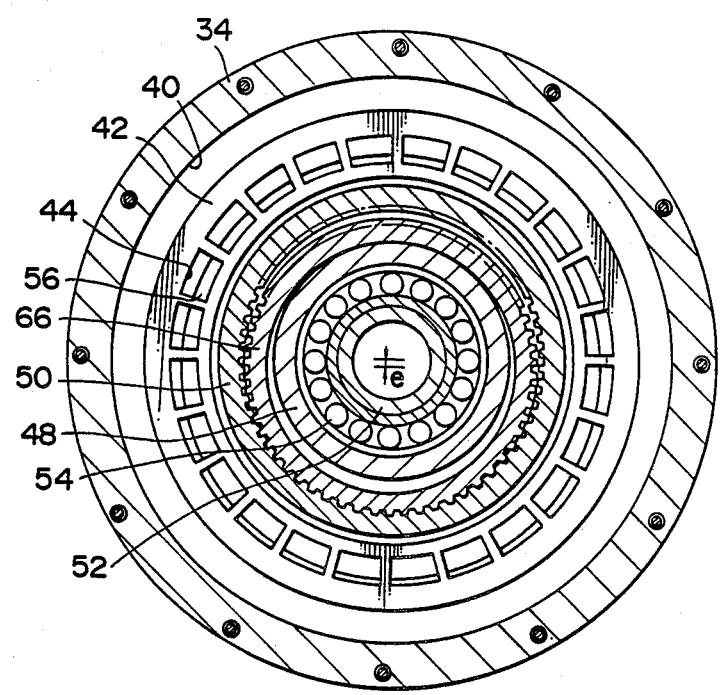
FIG. 4 is a sectional view taken along the line 4—4 in FIG. 3.

As shown in FIGS. 3 and 4, an annular grating 42 directed inward and defining the first and second spaces 38, 40 is mounted on the rear end face of the first tubular portion 34a. The grating 42 extends circularly along the rear end face of the first tubular portion 34a and is provided with a plurality of openings 44 spaced from each other at equal angular intervals around the axis of the shield body 32 such that small excavated substance is allowed to move from the first space 38 to the second space 40 while large excavated substance is prevented from moving from the first space 38 to the second space 40. The grating 42 may be mounted on the inside of the front end of the second tubular portion 34b. The second tubular portion 34b is provided with a partition wall 46 for dividing the interior of the shield body 32 into the front and rear regions.

As shown in FIGS. 3 and 4, the partition wall 46 unslidably and unrotatably supports a tubular sleeve 48 extending through the partition wall 46 axially of the shield body 32. To the side of the first tubular portion 34a of the partition wall 46 is fixed an internal gear 50 extending around the sleeve 48 by a plurality of bolts. In the sleeve 48, a crankshaft 52 extending through the sleeve 48 axially of the shield body 32 is rotatably journalled by a plurality of bearings 54. The crankshaft 52 is provided with a shaft portion 52a journalled by the sleeve 48 and an eccentric portion, i.e., a shaft portion 52b extending forward from the shaft portion 52a. The shaft portion 52a is coaxial with the shield body 32, while the axis of the shaft portion 52b is eccentric from the axes of the shield body 32 and shaft portion 52a by a distance e and disposed in the first space 38.

As shown in FIG. 3, in the shaft portion 52b, a rotor 56 constituting a crusher together with the first tubular portion 34a is rotatably supported by a plurality of bearings 58. The rotor 56 has a conical shape to have the outer surface gradually increasing toward the rear end side and is disposed in the first space 38. The gap between the outer surface of the rear end of the rotor 56 and the inner surface of the rear end of the first tubular portion 34a is set to be smaller than the dimension of each opening 44 of the grating 42 in the diametrical direction of the shield body 32. Further, a plurality of projections or grooves extending in the circumferential direction may be provided respectively on the inner surface of the first tubular portion 34a and the outer surface of the rotor 56, said surfaces defining the first space 38.

Figure 5:
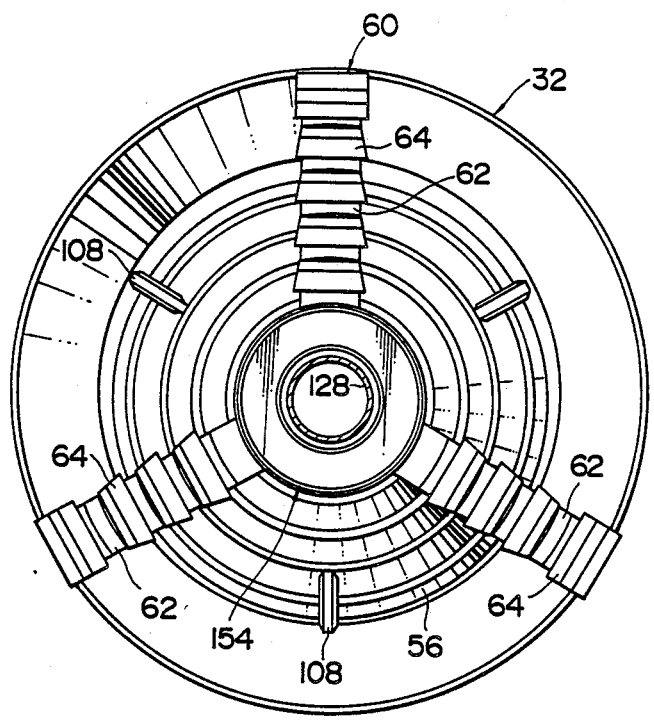
FIG. 5 is an enlarged-scale sectional view taken along the line 5—5 in FIG. 2.

As shown in FIGS. 3 and 5, a cutter assembly 60 is fixed to the tip of the rotor 56 and provided with a plurality of arms 62 extending from the rotor 56 radially of the shield body 32 and a plurality of cutter bits 64 fixed to the respective arms 62. Each cutter bit disposed on the outermost end of each arm 62 has a cutting edge directed inward to the rotary center of the cutter assembly 60 and another cutting edge directed outward in the reverse direction, whereas the other cutter bits have cutting edges respectively directed inward to the rotary center of the cutter assembly 60 while the cutting edges are respectively disposed rearward from those of the cutter bits disposed at the outside of the other cutter bits noted above. Further, each cutter bit may be disposed to have the cutting edge located in an identical plane orthogonal to the rotary axis of the cutter assembly 60.

As shown in FIGS. 3 and 4, an external gear 66 meshing with the internal gear 50 is fixed to the rear end face of the rotor 56 by a plurality of bolts. The external gear 66 is eccentric from the internal gear 50 by a distance e which is identical with the eccentricity of the shaft portion 52b relative to the shaft portion 52a of the crankshaft 52. Thus, the gears 50, 66 mesh with each other on one diametrical position which moves around the sleeve 48 along with the rotation of the crankshaft 52. As a result, the rotor 56 and cutter assembly 60 turn (revolve) around the axis of the shield body 32 while rotating (about their own axes) around the shaft portion 52b.

As shown in FIG. 3, a mechanical seal 68 is disposed between the rotor 56 and the internal gear 50 for liquid-tightly sealing between the rotor and the internal gear. The mechanical seal 68 is provided with an annular groove 70 provided at the rear end face of the rotor 56 and coaxial with the rotor 56, a tubular ring 72 fitted in the groove and having an approximately uniform outer diameter, an annular carrier seat 74 fixed to the front end face of the internal gear 50 and coaxial with the internal gear and a plurality of springs 76 for pressing the ring 72 against the carrier seat 74. The groove 70 opens to the side of the internal gear 50.

The ring 72 is provided with an annular main body slidably received in the groove 70 in the axial direction of the shield body 32 and a projection extending backward from the outer periphery of the rear end of the main body and coaxial with the main body. The main body and projection of the ring 72 have the same diameters and are placed coaxially with the rotor 56, i.e., eccentric from the internal gear 50 by the distance e. Each spring 76 is a compression coil spring disposed in a hole communicating to the groove 70.

The outer diameter of the main body and projection of the ring 72, more particularly the diameter of the contact surface (seal surface) between the rear end face of the ring 72 and the front end face of the carrier seat 74, i.e., between the ring 72 and the carrier seat 74 is smaller than the outer diameter of the carrier seat 74 by at least a distance 2e. Namely, assuming that the diameter of the outer periphery of the rear end face (projection) of the ring 72 is $D_1$ and the diameter of the outer periphery of the front end face of the carrier seat 74 is $D_2$, the diameter of the contact surface (seal surface) between the ring 72 and the carrier seat 74 is represented by the following formula;

$$D_1 \leq D_2 - 2e$$

As shown in FIG. 3, the partition wall 46 has an annular oil chamber 78 extending around the sleeve 48. Lubricant is received in the oil chamber 78. The oil chamber 78 communicates to a space defined between the crankshaft 52 and the sleeve 48 through a plurality of holes 80 bored in the partition wall 46, an annular groove 82 formed on the outer periphery of the sleeve 48 and a plurality of holes 84 bored in the sleeve 48. Thus, the space between the crankshaft 52 and the sleeve 48 and the gap between the partition wall 46 and the sleeve 48 are filled with the lubricant.

In the contact portion between the front end of the rotor 56 and the tip of the crankshaft 52, contact portion between the rotor 56 and the ring 72, contact portion between the partition wall 46 and the internal gear 50 and contact portion between the sleeve 48 and the partition wall 46, O-rings for sealing are disposed respectively. Also, a seal material 86 for preventing the lubricant from overflow is disposed between the rear end of the sleeve 48 and the rear end of the crankshaft 52. The seal material 86 is fixed to the sleeve 48 by a plurality of bolts.

As shown in FIGS. 2 and 3, the second main body 36 is provided with the first tubular portion 36a connected to the rear end of the second tubular portion 34b, the second tubular portion 36b inserted into the rear end of the first tubular portion 36a and a third tubular portion 36c connected to the rear end of the second tubular portion 36b. A support wall 88 which is orthogonal to the axis of the shield body 32 is provided on the front end of the first tubular portion 36a. A hole 90 for receiving the rear end of the sleeve 48 is bored in the support wall 88. The first and second tubular portions 36a, 36b of the second main body 36 are interconnected with each other by a plurality of jacks 92 used for correcting the direction. Between the second tubular portion 36b and the third tubular portion 36c and between the third tubular portion 36c and the foremost new pipe 14, connectors 93 and 95 are respectively disposed.

A drive mechanism 94 for rotating the crankshaft 52 is fixed to the rear portion of the support wall 88 by a plurality of bolts. The drive mechanism 94 is provided with a motor and a reduction gear. The output shaft 96 of the drive mechanism 94 is inserted into a hole bored in the rear end of the crankshaft 52. The output shaft 96 is unrotatably coupled with the crankshaft 52 by a key 98.

As shown in FIG. 3, the crankshaft 52, sleeve 48 and partition wall 46 are formed respectively with watercourses 100, 102 and 104 for guiding sewage in the existing pipe 12 to the temporary watercourse device 28. The watercourse 100 opens to the tip and outer periphery of the crankshaft 52. The watercourse 102 consists of an annular groove formed on the inner peripheral surface of the sleeve 48 and a hole for affording communication between the groove and the watercourse 104 so as to receive the sewage from the watercourse 100 and guide the same to the watercourse 104. On both sides of the annular groove, that is between the crankshaft 52 and the sleeve 48, annular mechanical seals 106 are disposed respectively for preventing the sewage from leakage. A pair of O-rings are disposed between the sleeve 48 and the partition wall 46 to prevent the sewage from leaking through the connection of the watercourses 102, 104.

As shown in FIGS. 3 and 5, on the outer conical surface of the rotor 56 are mounted a plurality of blades 108 which agitate excavated substance in the first space 38 along with the rotation of the rotor 56 to give fluidity to the excavated substance.

As shown in FIG. 1, the thrust device 22 is provided with a pair of rails 110 installed on the bottom of the shaft 18 so as to extend in the advancing direction of the machine 20, a slider 112 installed on the rail 110 so as to be movable along the rail and a plurality of jacks 114 for advancing the slider 112. The jacks 114 are mounted on a wall 116 constructed in the shaft 18.

The jacks 114 are extended after a new pipe is disposed between the preceeding rearmost new pipe 14 and the slider 112. Thus, the slider 112 is advanced to force the new pipe 14 into the vacant spot excavated by the machine 20, thereby advancing the machine 20. When the jacks 114 are extended by a predetermined distance, the jacks 114 are then contracted and the slider 112 is drawn back. Subsequently, a new pipe is disposed between the slider 112 and the rearmost new pipe 14 and thereafter the jacks 114 are extended again. The operations of contracting the jacks 114 and drawing back the slider 112 to add the new pipe by disposing between the rearmost new pipe and the slider 112 are carried out a plurality of times until the renewal of the existing pipeline, which is embedded between the starting shaft and the arrival shaft for the machine 20, is completed.

Figure 7:
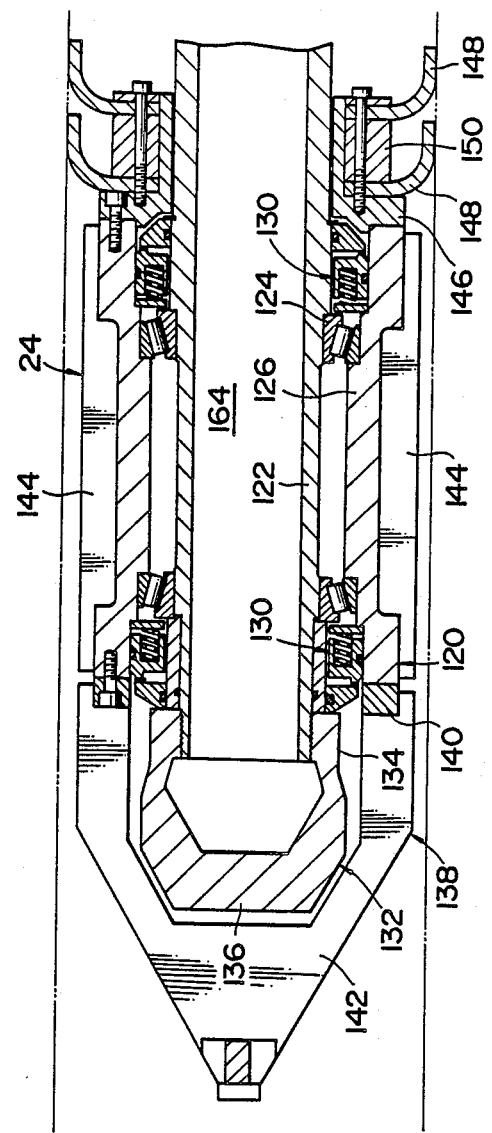
FIG. 7 is an enlarged-scale sectional view showing an embodiment of the seal device.
Figure 8:
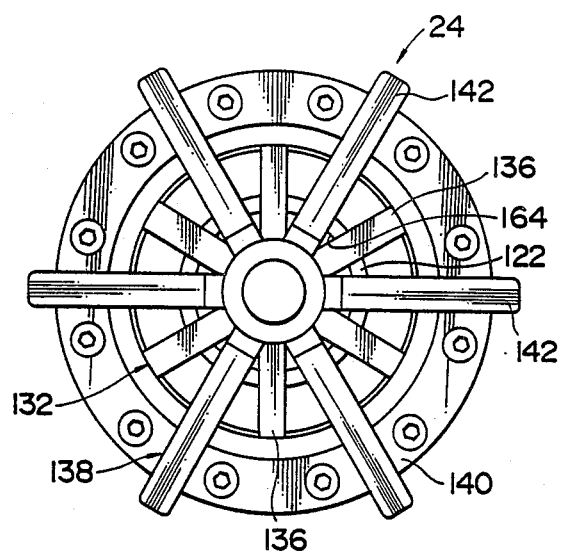
FIG. 8 is a left side view showing the seal device shown in FIG. 7.

As shown in FIGS. 7 and 8, the seal device 24 comprises a main body 120 movable in the existing pipe 12. The main body 120 is provided with a tubular shaft 122 extending along the axis of the existing pipe 12 and a tubular case or a frame 126 disposed around the shaft 122 such that the frame 126 is rotatable by a plurality of bearings 124. The shaft 122 is connected to the rotor 56 of the machine 20 by a connector 128 shown in FIGS. 1 and 9. A pair of mechanical seals 130 are disposed between the shaft 122 and the frame 126, and the lubricant is received in the region where the bearings 124 are disposed.

An agitating head 132 is fixed to the tip of the shaft 122. The agitating head 132 is provided with a boss 134 fixed to the shaft 122 and a plurality of blades 136 (six blades are shown, for example, in the drawing) fixed to the boss 134. The respective blades 136 are disposed at equal angular intervals about the axis of the shaft 122 and interconnected with each other on the tip of the shaft 122 by means of welding or the like.

On the tip of the frame 126 is mounted a guide head 138 for smoothing the movement of the seal device 24 in the existing pipe 12. The guide head 138 has a boss 140 mounted on the frame 126 by a plurality of bolts and a plurality of guides 142 (six guides are shown in the drawing, for example) fixed to the boss 140. On the outer periphery of the frame 126 are mounted a plurality of plate-like guides 144 (six guides are shown in the drawings, for example). The respective guides 142, 144 extend axially of the shaft 122 and are disposed at equal angular intervals about the axis of the shaft 122. The respective tips of the guides 142 are interconnected with each other by means of welding or the like. The respective tips of the guides 144 are also interconnected with each other by means of welding or the like.

A tail cover 146 is mounted on the rear end of the frame 126 by a plurality of bolts, and a spacer 150 provided with a plurality of disk-like seal members 148 is mounted on the tail cover 146 by a plurality of bolts. Each seal member 148 is made of a material like elastically deformable rubber.

Figure 9:
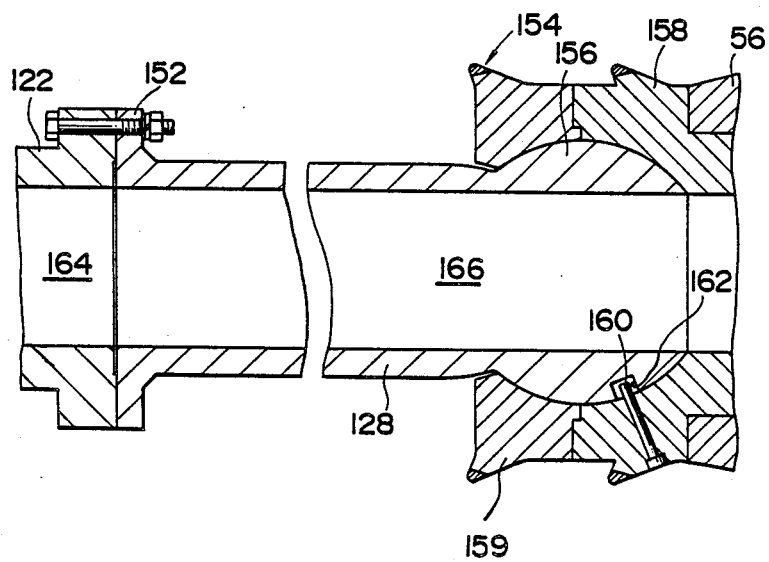
FIG. 9 is a sectional view showing an embodiment of a connector.

As shown in FIG. 9, the shaft 122 is connected to the connector 128 by a flange joint 152, while the connector 128 is connected to the rotor 56 by a universal joint 154 so as to allow the connector 128 and rotor 56 to be relatively bent. The universal joint 154 has a spherical body 156 provided in the connector 128, a pair of carrier seats 158, 159 coupled with each other by a plurality of bolts to rotatably receive the spherical body 156 and a pin 160 for allowing the spherical body 156 to engage the carrier seat 158 so as. The pin 160 extends through the carrier seat 158 to be received in a hole 162 bored in the spherical body 156. The hole 162 has the diameter larger than that of the pin 160. Therefore, spherical body 156 and carrier seat 158 can bend within a predetermined extent of angle while being blocked from the relatively large rotation. The carrier seat 158 is fixed to the tip of the rotor 56 by a plurality of bolts.

When the rotor 56 of the machine 20 is rotated, the shaft 122 is rotated relative to the frame 126. When the rotor 56 is turned and the existing pipeline is curved, the seal device 24 is inclined to the machine 20, while the inclination is absorbed by the universal joint 154.

A hollow portion of the shaft 122 and that of the connector 128 constitute watercourses 164, 166 for guiding the sewage in the existing pipe 12 to the watercourse 100 of the machine 20.

Figure 6:
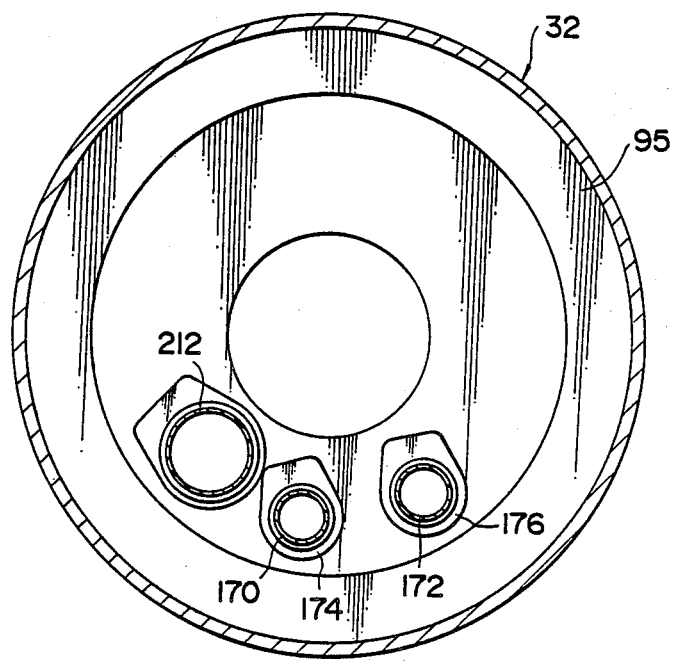
FIG. 6 is an enlarged-scale sectional view taken along the line 6—6 in FIG. 2.

As shown in FIGS. 1 and 6, the discharging device 26 for excavated substance comprises a pipe 170 for supplying muddy water for draining muck to the second space 40 and a pipe 172 for draining the excavated substance together with muddy water from the second space 40. One end of the pipe 170 is connected to the support wall 88 by a connector 174 and communicates to the second space 40 through a watercourse 178 (see FIG. 3) provided so as to extend through the partition wall 46 axially of the shield body 32. One end of the pipe 172 is also connected to the support wall 88 by a connector 176 as shown in FIG. 6 and communicates to the second space 40 through a watercourse (not shown) provided so as to extend through the partition wall 46 axially of the shield body 32. The connectors 174, 176 are fixed to the rear end face of the support wall 88 by a plurality of bolts (not shown).

As shown in FIG. 1, the pipe 170 communicates to a water supply tank 184 through a pipe 182, while the pipe 172 communicates to a sedimentation basin 188 through a pipe 186. A water supply pump 190 and a plurality of valves 192 are disposed in the pipe 182, and a drain pump 194 and a plurality of valves 196 are disposed in the pipe 186. The pipes 182, 186 are provided on the way with bendable and expansible pipes. The cross section of each hollow portion of the pipes 172, 186 for draining muck is larger than the area of each opening 44 in the grating 42. A discharge port of the water supply pump 190 and an intake port of the drain pump 194 are short-circuited by a short-circuit pipe 198 where a value 200 is disposed.

As shown in FIG. 3, on the bottom of the second space 40 is provided a partition 202 which prevents the muddy water supplied through the pipe 170 from reaching directly the pipe 172 and defines the muddy watercourse in the second space 40 such that the muddy water flows through the watercourse extending around the second space 40.

The pumps 190, 194 are operated at the time of excavation by the machine 20. Thus, the discharging device 26 supplies the muddy water in the tank 184 to the second space 40 of the machine 20 through the pipes 182, 170 and drains the muddy water in the second chamber 40 together with the excavated substance to the sedimentation basin 188 through the pipes 172, 186. On the contrary, the pumps 190, 194 are stopped at the time of the operation of adding the new pipes. After the pipes 182, 186 are inserted into the new pipe under the state that predetermined valves are closed, the predetermined valves are opened to operate the pumps 190, 194. Further, a part of muddy water supplied to the second chamber 40 flows into the first chamber 38. However, most of the muddy water is drained to the sedimentation basin 188 by the discharging device 26.

As shown in FIGS. 1 to 3, the temporary watercourse device 28 is provided with a first guide 212 including a plurality of pipes interconnected with each other by a flange joint 210, an expansible and bendable second guide 214 connected to the rear end of the first guide 212, a drain pump 216 connected to the rear end of the second guide 214 and a third guide 218 for guiding the sewage drained from the drain pump 216 to the pipe line 30 provided on the downstream side. The tip of the first guide 212 is connected to the support wall 88 by a connector 220 (see FIG. 3) and communicates to the watercourse 104 of the machine 20. The first guide 212 has a valve 222 (see FIG. 2) at a portion located in the shield body 32. A valve 224 is also disposed in the third guide 218. One end of the third guide 218 at the opposite side to the drain pump 216 is inserted into the pipeline 30 together with a sealing member 226 disposed in the one end of the third guide 218.

When the pump 216 is operated, sewage in the existing pipe 12 is adapted forcibly to flow to the succeeding pipeline 30 through the watercourse 164 of the seal device 24, watercourse 166 of the connecting pipe 128, watercourses 100, 102, 104 of the machine 20 and respective guides 212, 214, 218. Further, when the new pipe is added, the pump 216 is temporarily stopped and the valve 222 is temporarily closed so that the second guide 214 is inserted into the new pipe.

In the renewing operation, the drive mechanism 94 of the machine 20 is operated to rotate the crankshaft 52. Thus, the rotor 56 and cutter assembly 60 are turned (revolved) around the crankshaft 52 in the same direction as the rotational direction of the crankshaft 52 and are rotated around the axis which is eccentric from the axis of the shield body 32 by a distance e. Since the position where the external gear 66 fixed to the rotor 56 meshes with the internal gear 50 fixed to the partition wall 46 is sequentially displaced along with the turning of the rotor 56, the rotor 56 and cutter assembly 60 are also rotated (about their own axes) around the shaft portion 52b in the opposite direction to the rotational direction of the crankshaft 52.

By the turning and rotating movements of the rotor 56 and cutter assembly 60, the cutter bits 64 not only turn and rotate together with the cutter assembly 60 relative to the shield body 32, but also move inward and outward relative to the center of the shield body 32, i.e., reciprocate radially of the shield body 32.

When the cutter assembly 60 is turned and rotated as mentioned above, thrust is given to the machine 20 through the new pipe 14 by the thrust device 22. Thus, the new pipe 14 is forced into an excavated hole, and the machine 20 breaks the existing pipe 12 with the cutter assembly 60. At the same time, the machine 20 is advanced while excavating the earth and sand around the existing pipe 12.

Since the cutting edge of each cutter bit 64 is directed inward and the cutter bit 64 reciprocates radially of the shield body 32, the cutter bit 64 breaks the existing pipe 12 and excavates the earth and sand around the existing pipe 12 when the cutter bit 64 moves toward the rotary axis relative to the shield body 32, i.e., moves inward. The existing pipe 12 will be broken by receiving inward force due to the cutter bit 64. As a result, the existing pipe 12 is broken with smaller force, compared with an apparatus for breaking the existing pipe 12 by exerting outward force, i.e., force for expanding the existing pipe 12. Also, since force for breaking the existing pipe does not act on the existing pipe 12 when the cutter bit 64 is moved outward, no large crack is generated longitudinally of unbroken existing pipe 12.

The broken pieces of the existing pipe thus broken and muck containing excavated earth and sand, i.e., excavated substance are received in the first space 38.

The excavated substances thus received in the first space 38 are agitated by means of the blades 108 along with the rotation of the rotor 56 while moving from the first space 38 through the openings 44 in the grating 42 to the second space 40. The excavated substance reaching the second space 40 is mixed with muddy water supplied to the second space 40. The mixture, i.e., slurry is drained to the sedimentation basin 188 by the discharging device 26.

Large gravel and broken pieces contained in the excavated substance which is received in the first space 38 are pressed against the inner surface defining the first space 38 of the shield body 32 by the rotor 56 and then broken into smaller pieces capable of passing through the openings 44 along with the turning and rotating movements of the rotor 56. The broken smaller pieces capable of passing through the openings 44 are received in the second space 40 through the openings 44. Thus, the drain pipes 172, 186 are not clogged with the gravel and broken pieces.

During the renewing operation, the first and second spaces 38, 40 are held at a predetermined pressure for prevent the facing from collapsing and also for present the foundation from upheaving. Thus, a part of the excavated substance in the first space 38 flows into the existing pipe 12. However, the sealing member 148 of the seal device 24 is pressed against the inner peripheral surface of the existing pipe 12 by the excavated substance flowing into the existing pipe 12, so that the excavated substance is blocked from flowing in the existing pipe 12 forward further than the position of the seal device 24. The sealing member 148 blocks also the sewage in the existing pipe 12 from flowing into the first space 38.

The seal device 24 is advanced in the existing pipe 12 along with the advance of the machine 20. Then, since the guides 142, 144 of the seal device 24 serve as sleds, the seal device 24 is moved smoothly even if the inner peripheral surface of the existing pipe 12 is irregular.

The shaft 122 of the seal device 24 is rotated around the axis of the shaft 122 along with the rotation of the rotor 56 of the machine 20. Thus, the sewage in the existing pipe 12 is agitated by the agitating blades 136, and solid substance in the sewage is crushed by the blades 136. As a result, the seal device 24 can be moved more smoothly and the watercourse of the temporary watercourse device 28 is never clogged.

The ring 72 of the mechanical seal 68 turns about the carrier seat 74 by the turning and rotating movements of the rotor 56 while being pressed against the carrier seat 74. However, force of the ring 72 drawn back against the force of the spring 76 due to the pressure in the second space 40 does not act on the rear end face of the ring 72. Namely, even if the ring 72 of the mechanical seal 68 is pressed against the carrier seat 74 by the turning and rotating movements of the rotor 56 while turning around the carrier seat 74, the whole rear end face of the ring 72 is always brought into contact with the front end face of the carrier seat 74 since the outer diameter of the ring 72 is generally uniform and the diameter of the contact surface (seal surface) between the ring 72 and the carrier seat 74 is determined by the following formula;

$$D_1 \leqq D_2 - 2e$$

Accordingly, the force caused by the pressure in the second space 40 does not act on the rear end face of the ring 72. Thus, it is possible to hold the liquid-tightness between the ring 72 and the carrier seat 74.

What is claimed is:

1. A shield tunnelling machine for excavating an existing pipe embedded in the ground comprising:
   a shield body;
   a partition wall for dividing the interior of said shield body into a front region and a rear region;
   a crankshaft having a rotary axis extending axially of said shield body and supported rotatably by said partition wall and having an eccentric portion disposed in said front region;
   a cutter assembly having a rotary center and a plurality of cutter bits for excavation and disposed in the front region of said shield body, said cutter assembly being revolved around the rotary axis of said crankshaft while being rotated around the axis of said eccentric portion along with the rotation of said crankshaft to shift them radially of said shield body with respect thereto along with said revolving and rotational movements of the cutter assembly;
   wherein respective cutter bits have cutting edges directed inward toward the rotary center of said cutter assembly, each cutting edge being formed by a first inward surface substantially perpendicular to its imaginary radial line extending from the rotary center of said cutter assembly and a second forward surface raked back away from said rotary center, whereby said existing pipe is excavated by said cutter bits which are shifted toward said rotary axis with respect to said shield body.

2. A shield tunnelling machine as claimed in claim 1, further comprising:
   a rotor disposed in said front region of said shield body and supported rotatably by said eccentric portion of said crankshaft, and
   a gear mechanism provided with an internal gear fixed to one of said shield body or said partition wall and an external gear fixed to the other,
   said cutter assembly being mounted on a tip portion of said rotor, whereby said cutter assembly is revolved around the rotary axis of said crankshaft and rotated around said eccentric portion along with the rotation of said crankshaft.

3. A shield tunnelling machine as claimed in claim 1, wherein said crankshaft has a watercourse for flowing liquid extending from the front end toward the rear end thereof.

4. A shield tunnelling machine as claimed in claim 1, further comprising means for discharging substance excavated by said cutter assembly from said front region to the outside thereof.

5. A shield tunnelling machine as claimed in claim 1, wherein said cutter assembly further includes a plurality of outer cutter bits disposed outermost thereon, each outer cutter bit has an extrorse cutting edge directed radially outward of said cutter assembly and extending substantially perpendicular to an imaginary line extending radially from the rotary center of said cutter assembly, each extrorse cutting edge being formed by a second surface and a third surface directed radially outward and existing on the side opposite to said first surface.

6. A shield tunnelling machine for excavating an existing pipe embedded in the ground comprising:
   a shield body;

a partition wall for dividing the interior of said shield body into a front region and a rear region;

a crankshaft having a rotary axis extending axially of said shield body and supported rotatably by said partition wall and having an eccentric portion disposed in said front region;

drive means for rotating said crankshaft;

a cutter assembly mounted on said crankshaft for revolving and rotational movements therewith and having a plurality of cutter bits for excavation which reciprocally shift radially of said shield body with respect thereto along with said revolving and rotational movements of the cutter assembly, and disposed in the front region of said shield body, said cutter assembly being revolved around the rotary axis of said crankshaft while being rotated around the axis of said eccentric portion along with the rotation of said crankshaft; and wherein respective cutter bits have cutting edges directed inward toward the rotary center of said cutter assembly, each cutting edge being formed by a first inward surface substantially perpendicular to its imaginary radial line extending from the rotary center of said cutter assembly and a second forward surface raked back away from said rotary center, whereby said existing pipe is excavated by cutter bits which are shifted toward said rotary axis with respect to said shield body.

7. A shield tunnelling machine as claimed in claim 6, further comprising:

a rotor disposed in said front region of said shield body and supported rotatably by said eccentric portion of said crankshaft;

a gear mechanism provided with an internal gear fixed to one of said shield body or said partition wall and an external gear fixed to the other; and said cutter assembly being mounted on a tip portion of said rotor, whereby said cutter assembly is revolved around the rotary axis of said crankshaft and rotated around said eccentric portion along with the rotation of said crankshaft.

8. A shield tunnelling machine as claimed in claim 6, wherein said crankshaft has a watercourse for flowing liquid extending from the front end toward the rear end thereof.

9. A shield tunnelling machine as claimed in claim 6, further comprising means for discharging substance excavated by said cutter assembly from said front region to the outside thereof.

10. A shield tunnelling machine as claimed in claim 6, wherein said cutter assembly further includes a plurality of outer cutter bits disposed outermost thereon, each outer cutter bit has an extrorse cutting edge directed radially outward of said cutter assembly and extending substantially perpendicular to an imaginary line extending radially from the rotary center of said cutter assembly, each extrorse cutting edge being formed by a second surface and a third surface directed radially outward and existing on the side opposite to said first surface.

11. A shield tunnelling machine for excavating an existing pipe embedded in the ground comprising:

a shield body;

a partition wall for dividing the interior of said shield body into a front region and a rear region;

a crankshaft having a rotary axis extending axially of said shield body and supported rotatably by said partition wall and having an eccentric portion disposed in said front region;

drive means for rotating said crankshaft; and a cutter assembly mounted on said crankshaft for revolving and rotational movements therewith and having a rotary center, said cutter assembly provided with a plurality of cutter bits for excavation which reciprocally shift radially of said shield body with respect thereto along with said revolving and rotational movements of the cutter assembly, and disposed in the front region of said shield body, said cutter assembly being revolved around the rotary axis of said crankshaft while being rotated around the axis of said eccentric portion along with the rotation of said crankshaft, wherein respective cutter bits have cutting edges directed inward toward the rotary center of said cutter assembly, each cutting edge being formed by a first inward blade surface substantially perpendicular to its imaginary radial line extending from the rotary center of said cutter assembly and a second forward surface raked back away from said rotary center, whereby said existing pipe is excavated by cutter bits which are shifted toward said rotary axis with respect to said shield body.

12. A shield tunnelling machine for excavating an existing pipe embedded in the ground comprising:

a shield body;

a partition wall for dividing the interior of said shield body into a front region and a rear region;

a crankshaft having a rotary axis extending axially of said shield body and supported rotatably by said partition wall and having an eccentric portion disposed in front region;

drive means for rotating said crankshaft; and a cutter assembly mounted on said crankshaft for revolving and rotational movements therewith and having a rotary center, said cutter assembly provided with a plurality of cutter bits for excavation which reciprocally shift radially of said shield body with respect thereto along with said revolving and rotational movements of the cutter assembly, and disposed in the front region of said shield body, said cutter assembly being revolved around the rotary axis of said crankshaft while being rotated around the axis of said eccentric portion along with the rotation of said crankshaft;

wherein respective cutter bits have cutting edges directed inward toward the rotary center of said cutter assembly, each cutting edge being formed by an inward blade surface substantially perpendicular to its imaginary radial line corresponding thereto and an inward inclined surface rearwardly inclined from said rotary center;

whereby said existing pipe is excavated by cutter bits which are shifted toward said rotary axis with respect to said shield body.

13. A shield tunnelling machine as claimed in claim 12, wherein said crankshaft has a watercourse for flowing liquid extending from the front end toward the rear end thereof.

14. A shield tunnelling machine as claimed in claim 12, further comprising means for discharging substance excavated by said cutter assembly from said front region to the outside thereof.

15. A shield tunnelling machine as claimed in claim 12, wherein said cutter assembly further includes a plurality of outer cutter bits disposed outermost thereon, each outer cutter bit has an extrorse cutting edge directed radially outward of said cutter assembly and extending substantially perpendicular to an imaginary line extending radially from the rotary center of said cutter assembly, each extrorse cutting edge being formed by an inclined surface and a third surface directed radially outward and existing on the side opposite to said blade surface.

16. A shield tunnelling machine for excavating an existing pipe embedded in the ground comprising:
    a shield body;
    a partition wall for dividing the interior of said shield body into a front region and a rear region;
    a crankshaft having a rotary axis extending axially of said shield body and supported rotatably by said partition wall and having an eccentric portion disposed in said front region;
    drive means for rotating said crankshaft; and
    a cutter assembly mounted on said crankshaft for revolving and rotational movements therewith and having a rotary center, said cutter assembly provided with a plurality of cutter bits for excavation which reciprocally shift radially of said shield body with respect thereto along with said revolving and rotational movements of the cutter assembly, and disposed in the front region of said shield body, said cutter assembly being revolved around the rotary axis of said crankshaft while being rotated around the axis of said eccentric portion along with the rotation of said crankshaft;
    wherein each cutter bit has an introrse cutting edge inwardly directed toward the center of said cutter assembly, each said cutting edge extending substantially perpendicular to an imaginary line extending radially from said rotary center, each said cutting edge being formed by an inward blade surface substantially perpendicular to its imaginary line and a forward inclined surface raked back away from said rotary center, whereby said existing pipe is excavated by cutter bits which are shifted toward said rotary axis with respect to said shield body.

17. A shield tunnelling machine as claimed in claim 16, further comprising:
    a rotor disposed in said front region of said shield body and supported rotatably by said eccentric portion of said crankshaft;
    a gear mechanism provided with an internal gear fixed to one of said shield body or said partition wall and an external gear fixed to the other; and
    said cutter assembly being mounted on a tip portion of said rotor, whereby said cutter assembly is revolved around the rotary axis of said crankshaft and rotated around said eccentric portion along with the rotation of said crankshaft.

18. A shield tunnelling machine as claimed in claim 16, wherein said crankshaft has a watercourse for flowing liquid extending from the front end toward the rear end thereof.

19. A shield tunnelling machine as claimed in claim 16, further comprising means for discharging substance excavated by said cutter assembly from said front region to the outside thereof.

20. A shield tunnelling machine as claimed in claim 16, wherein said cutter assembly further includes a plurality of outer cutter bits disposed outermost thereon, each outer cutter bit has an extrorse cutting edge directed radially outward of said cutter assembly and extending substantially perpendicular to an imaginary line extending radially from the rotary center of said cutter assembly, each extrorse cutting edge being formed by an inclined surface and a third surface directed radially outward and existing on the side opposite to said blade surface.

* * * * *